(12) United States Patent
Ritter et al.

(10) Patent No.: US 9,075,484 B2
(45) Date of Patent: Jul. 7, 2015

(54) SENSOR PATTERNS FOR MUTUAL CAPACITANCE TOUCHSCREENS

(75) Inventors: Robert Ritter, Los Gatos, CA (US); Kenneth Brewer, Santa Clara, CA (US); Vitali Souchkov, Walnut Creek, CA (US); Sarangan Narasimhan, Mountain View, CA (US)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 1374 days.

(21) Appl. No.: 12/476,690

(22) Filed: Jun. 2, 2009

(65) Prior Publication Data

US 2010/0302201 A1      Dec. 2, 2010

(51) Int. Cl.
*G06F 3/044*      (2006.01)

(52) U.S. Cl.
CPC ...... *G06F 3/044* (2013.01); *G06F 2203/04111* (2013.01)

(58) Field of Classification Search
CPC .............. G06F 3/044; G06F 2203/04111
USPC .......................... 345/174, 156, 104
See application file for complete search history.

(56) References Cited

U.S. PATENT DOCUMENTS

| | | | |
|---|---|---|---|
| 7,202,859 B1 | 4/2007 | Speck et al. | |
| 8,059,015 B2 * | 11/2011 | Hua et al. | 341/33 |
| 8,243,027 B2 * | 8/2012 | Hotelling et al. | 345/173 |
| 2007/0273560 A1 | 11/2007 | Hua | |
| 2008/0062148 A1 | 3/2008 | Hotelling et al. | |
| 2008/0158183 A1 | 7/2008 | Hotelling et al. | |
| 2008/0278178 A1 | 11/2008 | Philipp | |
| 2008/0309633 A1 | 12/2008 | Hotelling et al. | |
| 2009/0091551 A1 | 4/2009 | Hotelling et al. | |

FOREIGN PATENT DOCUMENTS

CN          101311890 A      11/2008

* cited by examiner

*Primary Examiner* — William Boddie
*Assistant Examiner* — Leonid Shapiro
(74) *Attorney, Agent, or Firm* — Winston Hsu; Scott Margo

(57) ABSTRACT

According to one embodiment, there is provided a mutual capacitance touchscreen comprising a first set of electrically conductive traces arranged in rows or columns and a second set of electrically conductive traces arranged in rows or columns arranged at right angles with respect to the rows or columns of the first set, where the first and second sets of traces are electrically insulated from and interdigitated respecting one another, and gaps between the first and second sets of traces form boundaries between the first and second sets of traces that undulate and that are not straight or linear. Other embodiments of a mutual capacitance touchscreen are also disclosed, such as "mini-diamond" sensor array patterns and sensor array patterns that may be manufactured at low cost.

20 Claims, 10 Drawing Sheets

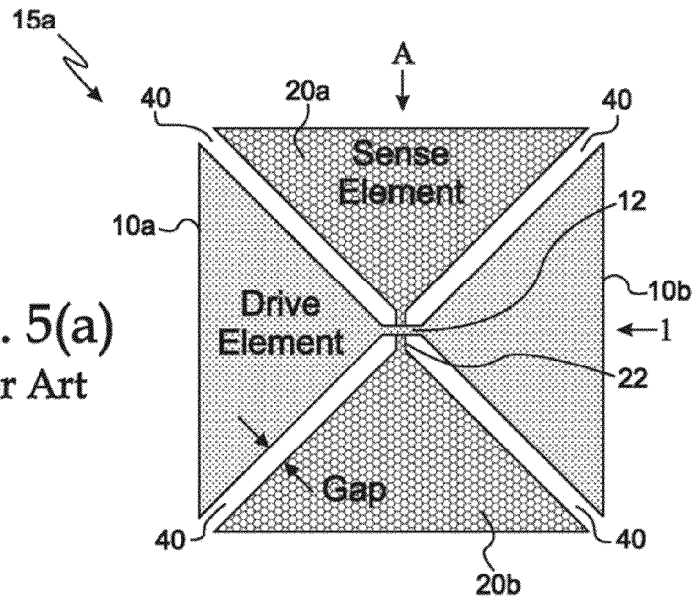
FIG. 5(a) Prior Art
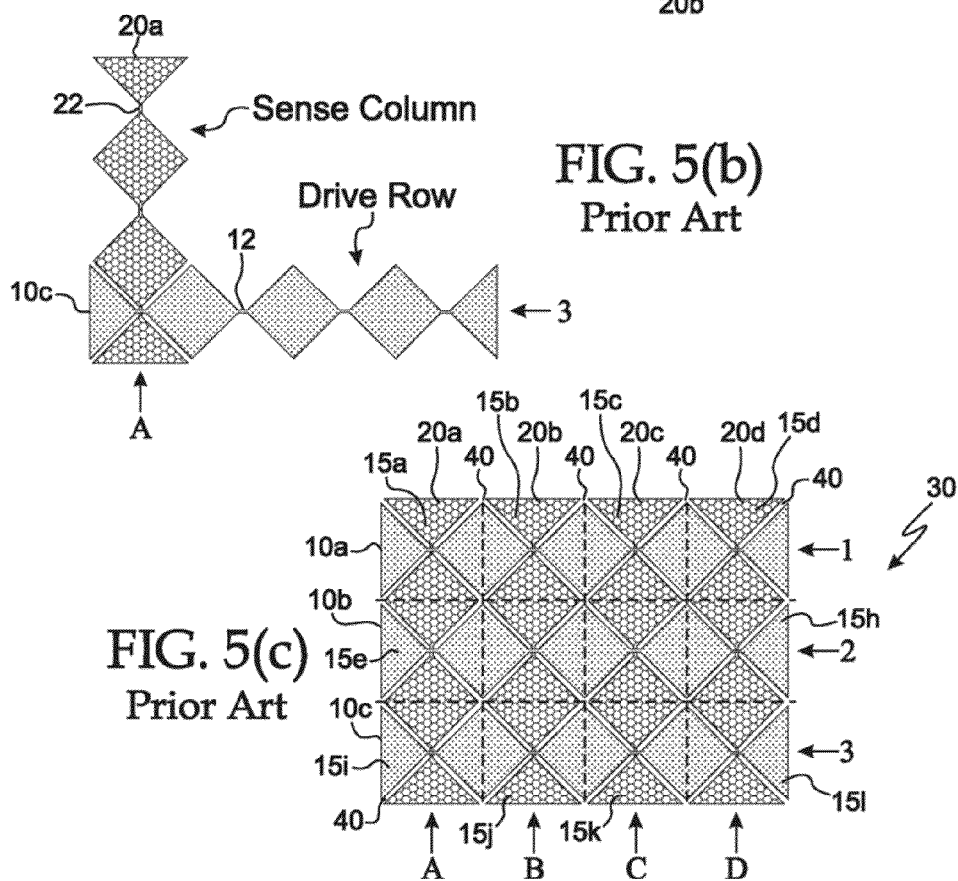
FIG. 5(b) Prior Art
FIG. 5(c) Prior Art

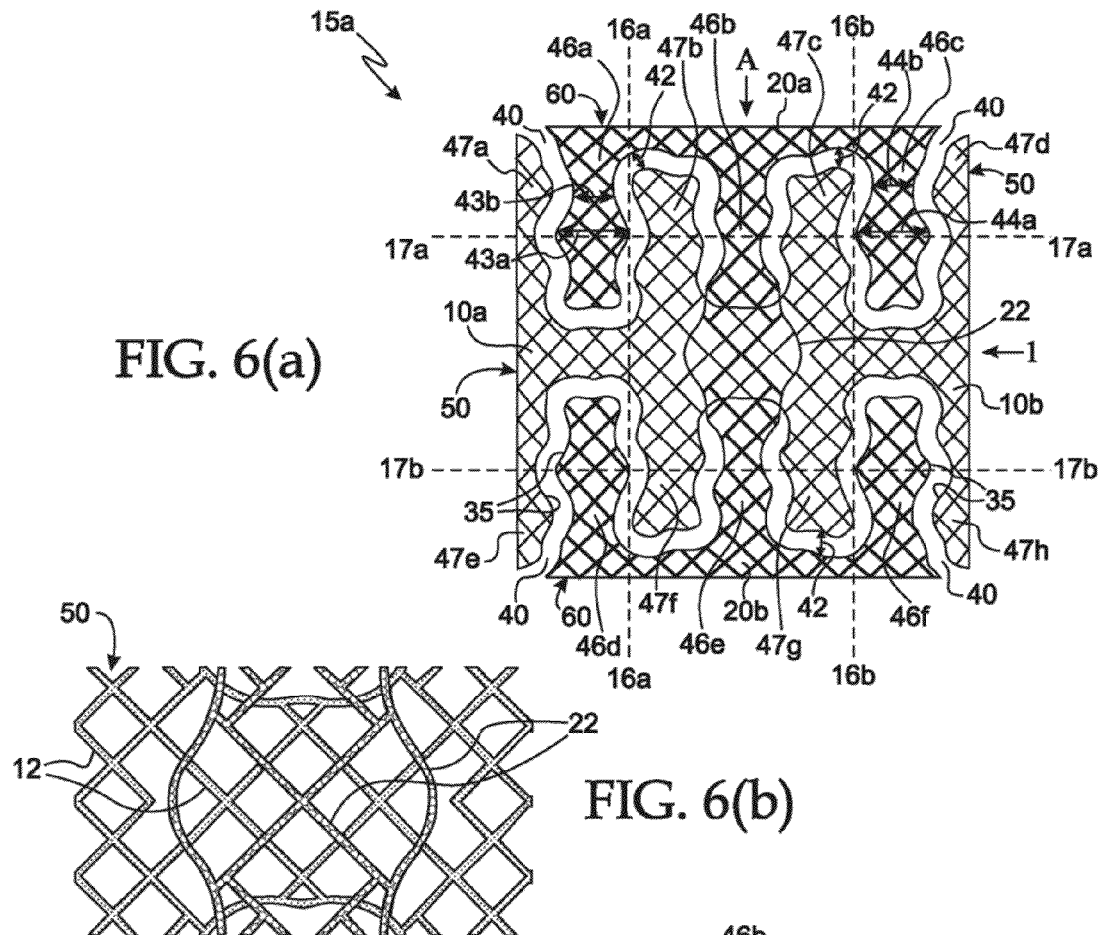
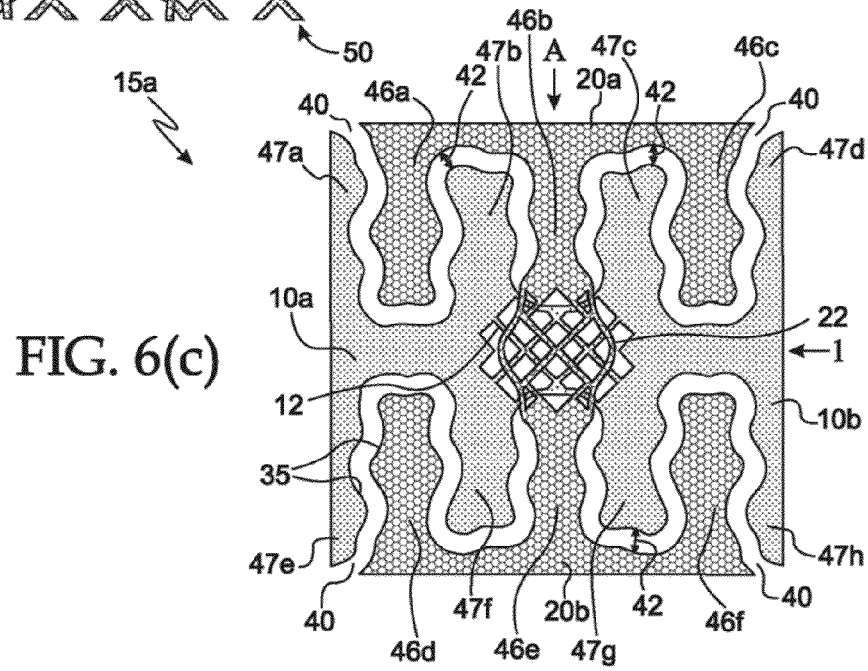
FIG. 6(a)
FIG. 6(b)
FIG. 6(c)

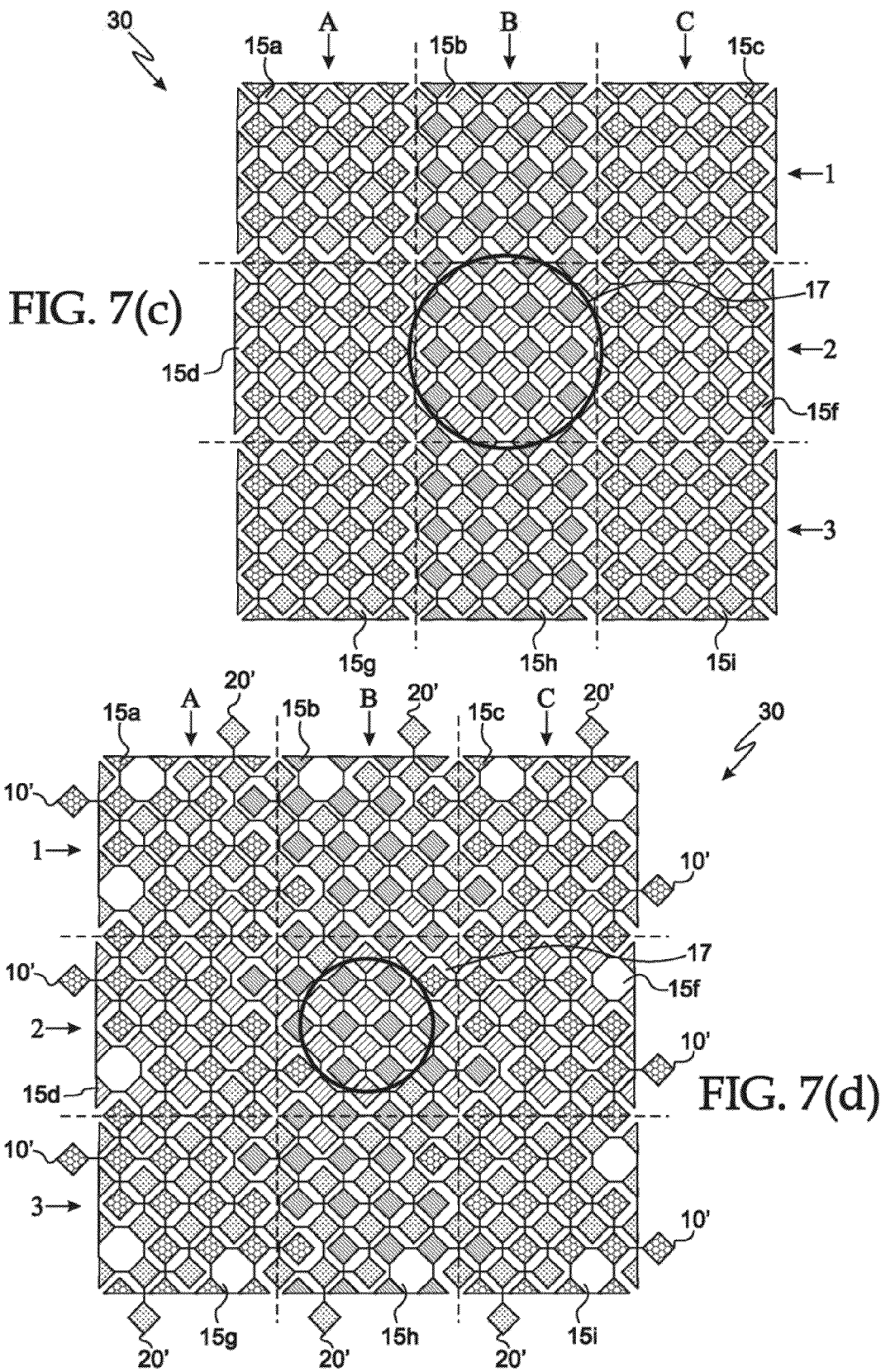

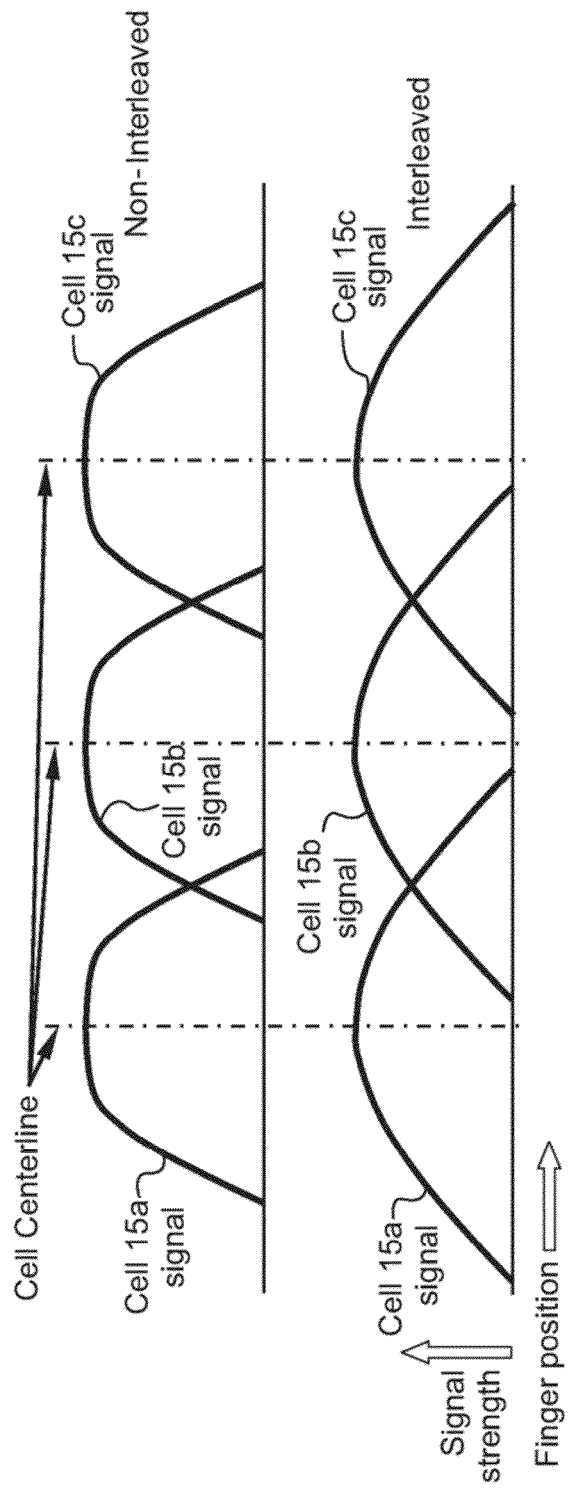

SENSOR PATTERNS FOR MUTUAL CAPACITANCE TOUCHSCREENS

FIELD OF THE INVENTION

Various embodiments of the invention described herein relate to the field of capacitive sensing input devices generally, and more specifically to mutual capacitance measurement or sensing systems, devices, components and methods finding particularly efficacious applications in touchscreens underlain by LCD displays. Embodiments of the invention described herein include those amenable for use in portable or hand-held devices such cell phones, MP3 players, personal computers, game controllers, laptop computers, PDA's and the like. Also described are embodiments adapted for use in stationary applications such as in industrial controls, household appliances, exercise equipment, and the like.

BACKGROUND

Two principal capacitive sensing and measurement technologies are currently employed in most touchpad and touchscreen devices. The first such technology is that of self-capacitance. Many devices manufactured by SYNAPTICS™ employ self-capacitance measurement techniques, as do integrated circuit (IC) devices such as the CYPRESS PSOC.™ Self-capacitance involves measuring the self-capacitance of a series of electrode pads using techniques such as those described in U.S. Pat. No. 5,543,588 to Bisset et al. entitled "Touch Pad Driven Handheld Computing Device" dated Aug. 6, 1996.

Self-capacitance may be measured through the detection of the amount of charge accumulated on an object held at a given voltage ($Q=CV$). Self-capacitance is typically measured by applying a known voltage to an electrode, and then using a circuit to measure how much charge flows to that same electrode. When external objects are brought close to the electrode, additional charge is attracted to the electrode. As a result, the self-capacitance of the electrode increases. Many touch sensors are configured such that the grounded object is a finger. The human body is essentially a capacitor to a surface where the electrical field vanishes, and typically has a capacitance of around 100 pF.

Electrodes in self-capacitance touchpads are typically arranged in rows and columns. By scanning first rows and then columns the locations of individual disturbances induced by the presence of a finger, for example, can be determined. To effect accurate multi-touch measurements in a touchpad, however, it may be required that several finger touches be measured simultaneously. In such a case, row and column techniques for self-capacitance measurement can lead to inconclusive results.

One way in which the number of electrodes can be reduced in a self-capacitance system is by interleaving the electrodes in a saw-tooth pattern. Such interleaving creates a larger region where a finger is sensed by a limited number of adjacent electrodes allowing better interpolation, and therefore fewer electrodes. Such patterns can be particularly effective in one dimensional sensors, such as those employed in IPOD click-wheels. See, for example, U.S. Pat. No. 6,879,930 to Sinclair et al. entitled Capacitance touch slider dated Apr. 12, 2005.

The second primary capacitive sensing and measurement technology employed in touchpad and touchscreen devices is that of mutual capacitance, where measurements are performed using a crossed grid of electrodes. See, for example, U.S. Pat. No. 5,861,875 to Gerpheide entitled "Methods and Apparatus for Data Input" dated Jan. 19, 1999. Mutual capacitance technology is employed in touchpad devices manufactured by CIRQUE.™ In mutual capacitance measurement, capacitance is measured between two conductors, as opposed to a self-capacitance measurement in which the capacitance of a single conductor is measured, and which may be affected by other objects in proximity thereto.

In some mutual capacitance measurement systems, an array of sense electrodes is disposed on a first side of a substrate and an array of drive electrodes is disposed on a second side of the substrate that opposes the first side, a column or row of electrodes in the drive electrode array is driven to a particular voltage, the mutual capacitance to a single row (or column) of the sense electrode array is measured, and the capacitance at a single row-column intersection is determined. By scanning all the rows and columns a map of capacitance measurements may be created for all the nodes in the grid. When a user's finger or other electrically conductive object approaches a given grid point, some of the electric field lines emanating from or near the grid point are deflected, thereby decreasing the mutual capacitance of the two electrodes at the grid point. Because each measurement probes only a single grid intersection point, no measurement ambiguities arise with multiple touches as in the case of some self-capacitance systems. Moreover, it is possible to measure a grid of n×n intersections with only 2n pins on an IC.

Despite the advantages of a mutual capacitance measurement system, however, such a mutual capacitance grid arrangement is generally better suited to touchpad applications than touchscreen applications. In many touchscreen designs, for example, each of the rows and columns of electrodes requires its own layer of indium tin oxide (ITO). Using stacked layers of ITO can result in an excessive amount of light being absorbed by, or otherwise not transmitted through, a display, which decreases display brightness. In addition, with volume at such a premium in small handheld devices, anything that can be done to decrease the footprint, volume or thickness of a device is helpful.

Further complicating things is the fact that LCD displays are often employed in conjunction with overlying capacitive touchscreens. Because the individual LCD pixels used to form such displays are arranged in rows and columns, undesirable Moiré patterns or other types of optical interference patterns can be generated if the overlying touchscreen includes electrode elements that are also arranged in vertical columns and horizontal rows.

What is needed is a capacitive measurement system that may be employed in touchscreen and touchpad applications that is capable of distinguishing between multiple touches, does not absorb or otherwise excessively impede the transmission of light therethrough, has a small footprint, volume or thickness, and is highly sensitive to small touch objects being brought into proximity thereto.

SUMMARY

In one embodiment, there is a provided a mutual capacitance touchscreen comprising a first set of electrically conductive traces arranged in rows or columns, and a second set of electrically conductive traces arranged in rows or columns arranged at an angle with respect to the rows or columns of the first set, wherein the first and second sets of traces are electrically insulated from and interdigitated respecting one another, and gaps between the first and second sets of traces form boundaries between the first and second sets of traces that undulate and are not straight.

In another embodiment, there is provided a mutual capacitance touchscreen comprising a first set of electrically conductive traces arranged in rows or columns, and a second set of electrically conductive traces arranged in rows or columns arranged at an angle with respect to the rows or columns of the first set, wherein the first and second sets of traces are electrically insulated from another and form a plurality of cells in each of the rows and columns, each cell comprising a plurality of sub-cell drive electrodes electrically connected to one another by first cross-over traces and a plurality of sub-cell sense electrodes electrically connected to one another by second cross-over traces, the sub-cell drive and sense electrodes being interleaved with respect to, and disposed in between, one another within each cell, the sub-cell sense and drive electrodes being separated by gaps within each cell, the first and second sets of electrically conductive traces comprising and being electrically connected to the drive and sense electrodes, respectively.

In yet another embodiment, there is provided a mutual capacitance touchscreen comprising a first set of electrically conductive traces arranged in rows or columns and a second set of electrically conductive traces arranged in rows or columns arranged at an angle with respect to the rows or columns of the first set, wherein the first and second sets of traces are electrically insulated from another, each cell comprising a plurality of sub-cell drive electrodes electrically connected to one another by first cross-over traces and a plurality of sub-cell sense electrodes electrically connected to one another by second cross-over traces, the sub-cell drive and sense electrodes being interleaved with respect to, and disposed in between, one another within each cell, the sub-cell sense and drive electrodes being separated by gaps within each cell, the first and second sets of electrically conductive traces comprising and being electrically connected to the drive and sense electrodes, respectively, each cell further comprising at least one sub-cell drive electrode extending outside such cell to a neighboring cell, and at least one sub-cell sense electrode extending outside such cell to another neighboring cell, the at least one sub-cell drive electrode and the at least one sub-cell sense electrode being electrically connected to other sub-cell drive and sense electrodes located within such cell.

In still another embodiment, there is provided a mutual capacitance touchscreen comprising a first set of electrically conductive traces arranged in rows or columns and a second set of electrically conductive traces arranged in rows or columns arranged at an angle with respect to the rows or columns of the first set, wherein the first and second sets of traces are electrically insulated from another, each cell comprising a plurality of sub-cell rectangular or square drive electrodes electrically connected to one another by first cross-over traces and a plurality of sub-cell rectangular or square sense electrodes electrically connected to one another by second cross-over traces, the sub-cell drive and sense electrodes being interleaved with respect to, and disposed in between, one another within each cell, the sub-cell sense and drive electrodes being separated by gaps within each cell, the first and second sets of electrically conductive traces comprising and being electrically connected to the drive and sense electrodes.

Further embodiments are disclosed herein or will become apparent to those skilled in the art after having read and understood the specification and drawings hereof.

BRIEF DESCRIPTION OF THE DRAWINGS

Different aspects of the various embodiments of the invention will become apparent from the following specification, drawings and claims in which:

FIG. 5(a) shows a single cell of a prior art diamond-shaped electrode pattern;

FIG. 5(b) shows one row of drive electrodes interleaved with one column of sense electrodes.

FIG. 5(c) shows rows of drive electrodes and columns of sense electrodes configured in an array;

FIGS. 6(a) through 6(c) illustrate various embodiments of mutual capacitance touchscreen cells and sensor arrays comprising interdigitated drive and sense electrodes where sinuous, curving boundaries define gaps between the interdigitated drive and sense electrodes;

FIGS. 7(a) through 7(f) illustrate various embodiments of mutual capacitance touchscreen cells and sensor arrays comprising "mini-diamond" sub-cell drive and sense electrodes.

The drawings are not necessarily to scale. Like numbers refer to like parts or steps throughout the drawings.

DETAILED DESCRIPTION OF SOME PREFERRED EMBODIMENTS

Figure 1:
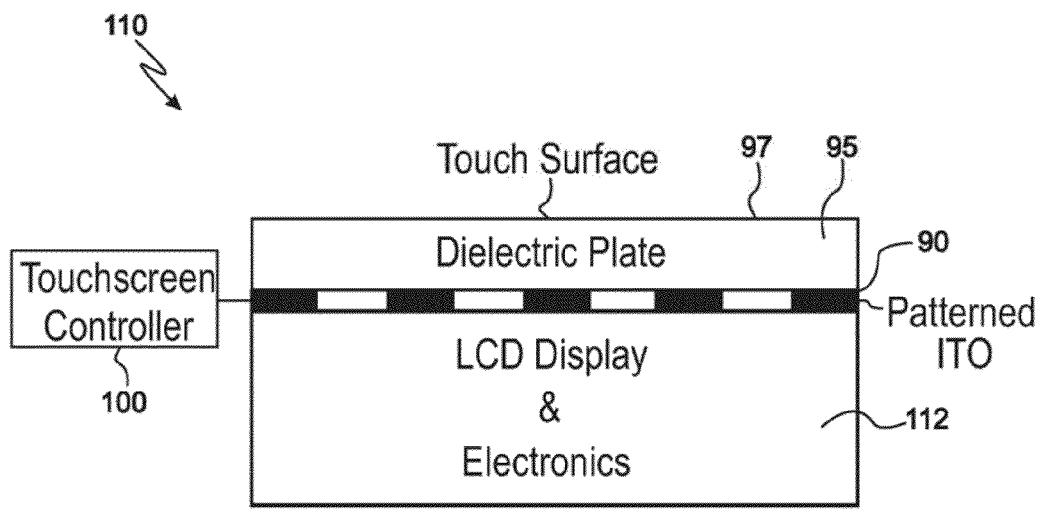
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100.

Figure 2:
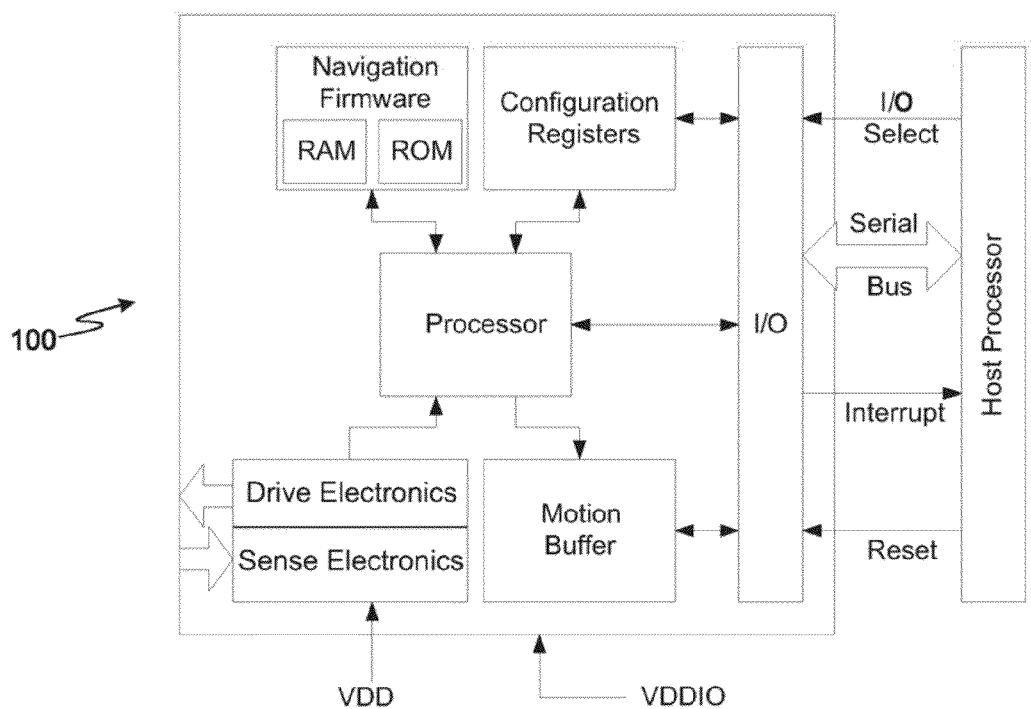
FIG. 2 shows a block diagram of a touchscreen controller.

FIG. 2 shows a block diagram of an Avago Technologies™ AMRI-5000 ASIC or chip 100, which is a low-power capacitive touch-panel controller designed to provide a touchscreen system with high-accuracy, on-screen navigation. Capacitive touchscreens 90 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which creates a disruption. The touchscreen controller 100 senses and analyzes the coordinates of these disruptions. When the touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for the AMRI-5000 chip include, but are not limited to, smart phones, portable media players, mobile internet devices (MIDs), and GPS devices.

Figure 3:
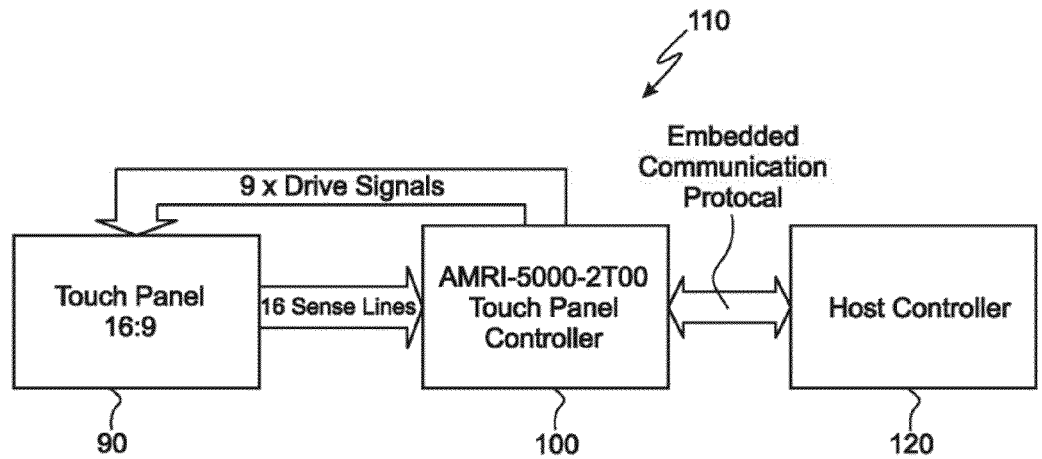
FIG. 3 shows one embodiment of a block diagram of a touchscreen system and a host controller.
Figure 4:
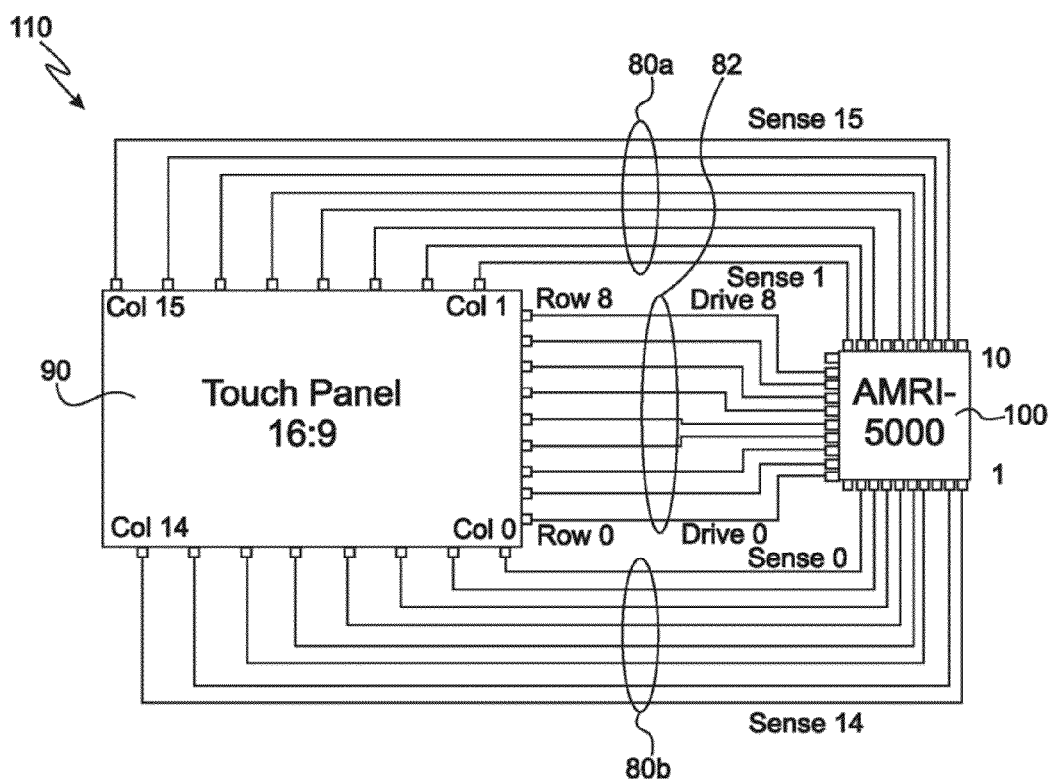
FIG. 4 shows a schematic block diagram of one embodiment of a touchscreen system.

Referring now to FIGS. 3 and 4, in one possible embodiment the AMRI-5000 touchscreen controller 100 includes an analog front-end with 9 drive signal lines and 16 sense lines connected to an ITO grid on a touchscreen. The controller 100 applies an excitation square wave to the drive electrodes that may have a frequency selected from a range between about 40 kHz and about 200 kHz. The AC signal is coupled to the sense lines via mutual capacitance. Touching the panel 90 with a finger alters the capacitance at the location of the touch. The AMRI-5000 controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading.

The AMRI-5000 touchscreen controller 100 features multiple operating modes with varying levels of power consumption. In rest mode the controller periodically looks for touches at a rate programmed by the rest rate registers. There are multiple rest modes, each with successively lower power consumption. In the absence of a touch for a certain interval the controller 100 automatically shifts to the next-lowest power consumption mode. However, as power consumption is reduced the response time to touches increases.

According to one embodiment, the ITO grid on the touchscreen 90 comprises rows 82 and columns 80a and 80b, where rows 82 are connected to drive signal lines and columns 80a and 80b are connected to sense lines. One configuration for routing ITO drive and sense lines to the AMRI-5000 chip is shown in FIG. 4.

The rest mode is a low power mode provided to save battery life. In rest mode, the device periodically looks for motion or touch at a rate programmed by rest rate registers and the responsiveness of the device is significantly reduced to save power. If the presence of a finger on the touchscreen is detected, the controller shifts to run mode. In the absence of finger detection for a predetermined period of time, the controller downshifts to the next slowest rest mode. Rest periods and downshift times are preferably programmable by firmware, and can be overridden via user register writes.

Those skilled in the art will understand that touchscreen controllers, micro-processors, ASICs or CPUs other than an AMRI-5000 chip may be employed in touchscreen system 110, and that different numbers of drive and sense lines, and different numbers and configurations of drive and sense electrodes, other than those explicitly shown herein may be employed without departing from the scope or spirit of the various embodiments of the invention.

FIGS. 5(a) through 5(c) show several different aspects of a prior art diamond-shaped electrode pattern capacitive touchscreen. FIG. 5(a) shows a single cell 15a of a prior art diamond-shaped electrode pattern comprising one drive electrode element having left and right portions 10a and 10a' and one sense electrode element having upper and lower portions 20a and 20a'. As shown in FIG. 5(a), left and right portions 10a and 10a' of a single drive electrode are electrically connected to one another by first cross-over 12, while upper and lower portions 20a and 20a' of a single sense electrode are electrically connected to one another by second cross-over 22. Crossovers 12 and 22 must be electrically insulated from one another for the touchscreen to operate. When crossovers 12 and 22 are employed, drive and sense electrodes 10 and 20 can be arranged in a matrix formed in a single layer of ITO. Alternatively, drive and sense electrodes 10 and 20 may be disposed in substantially parallel planes that are vertically offset from one another by a layer of electrically insulative material, such as a suitable electrically insulative polymer, glass or plastic, in which event no crossovers are required.

FIG. 5(b) shows one row 3 of drive electrodes interleaved with one column A of sense electrodes. FIG. 5(c) shows how rows 1, 2 and 3 of drive electrodes 10a, 10b, 10c, and 10d and columns A, B, C and D of sense electrodes 20a, 20b, 20c and 20d form a 3×4 array 30 of sense and drive electrodes. Each of cells 15a through 15l in array 30 contains one complete drive electrode and one complete sense electrode, where drive and sense electrodes 10 and 20 are interleaved and arranged adjacent one another, gaps 40 separate drive and sense electrodes 10 and 20, and crossovers 12 and 22 connect drive and sense electrodes 10 and 20 to the same row or column of corresponding electrodes. As a user's finger moves over array 30, the location of the user's finger is detected by array 30 operating in conjunction with controller 100 (see FIGS. 1-4) containing the requisite driving and sensing circuitry (not shown in FIGS. 5(a) through 5(c), but described in detail above).

As further illustrated in FIGS. 5(a) through 5(c), it will be seen that gaps 40 are of constant width, linear in aspect and straight. Gaps 40 between sense and drive electrodes 10 and 20 are necessary for the touchscreen to function. Electrical field lines project across gaps 40 between drive electrodes 10 and sense electrodes 20, and are disturbed or pulled to ground by the presence of a user's finger, thereby permitting detection of the user's finger's location on array 30. The width and length of gaps 40 affect cell performance. Among other things, the optimal gap width for a given electrode pattern can depend on the thickness of an overlying protective glass layer employed in most capacitive touchscreens.

FIGS. 5(a) through 5(c) illustrate several further aspects of a prior art diamond-shaped electrode pattern capacitive touchscreen. Drive and sense electrodes 10 and 20 will be seen to occupy a large portion of the surface of the touchscreen, which reduces the optical transmissivity of the touchscreen respecting light emitted by an underlying LCD panel or screen. The edges presented by the diamond-shaped pattern of drive and sense electrodes 10 and 20 are arranged at roughly 45 degree angles in respect of the underlying LCD panel, where individual LCD pixels disposed therein are typically arranged in horizontally-oriented rows and vertically-oriented columns (such as, for example, a 380×640 array of LCD pixels, which according to one embodiment results in a 30×30 array of LCD pixels underlying each cell 15).

It has been discovered that a lack of optical alignment between the rows and columns of the underlying LCD pixels and the overlying diamond-shaped electrodes having edges arranged at 45 degree angles with respect to the underlying rectangular grid of LCD pixels results in a touchscreen 110 largely free from the effects of Moiré patterns or other optical interference effects that might otherwise arise from light reflecting, scattering, refracting or otherwise interacting between the underlying pattern of LCD pixels and the overlying pattern of drive and sense electrodes in undesired or unexpected ways. It is believed that one or more beat visual frequencies can be generated when a first grid of orthogonal ITO electrodes overlies a second orthogonal grid of LCD pixels when the pitches of the first and second grids are similar. In such a situation, it is believed that light emitted by the LCD pixels may wind up bouncing around between the underlying LCD panel and the underside of the overlying ITO grid, thereby creating undesired optical effects or interference, such as Moiré patterns. The electrode configurations shown in FIGS. 6(a) through 6(c) help eliminate or reduce the magnitude of these problems, more about which is said below.

FIGS. 6(a) through 6(c) illustrate various embodiments of a mutual capacitance touchscreen comprising interdigitated drive and sense electrodes 10 and 20 where sinuous, curving boundaries 35 define gaps 40 between interdigitated drive and sense electrodes 10 and 20. A first set of electrically conductive drive traces or electrodes 10 is arranged in rows, and a second set of electrically conductive traces or sense electrodes 20 is arranged in columns. The rows of the first set 10 are arranged at right angles with respect to the columns of the second set 20. As further shown in FIGS. 6(a) through 6(c), the first and second sets of traces or electrodes 10 and 20 are electrically insulated from and interdigitated respecting one another, and gaps 40 between the first and second sets of traces or electrodes 10 and 20 form substantially continuously curving and sinuous boundaries 35 between the first and second sets of traces or electrodes 10 and 20. In one embodiment, individual cells 15 forming array 30 are formed in squares having 4.6 mm sides, although any other suitable length or cell configuration may be employed. (Note for purposes of clarification that FIGS. 5(a), 5(c), 6(a), 6(c),7(a), 7(b), 8(a), (b), 8(c) and 8(d) show but one cell 15a from among a plurality of cells 15 forming array 30.)

In a preferred embodiment, a first layer of ITO comprising a first set of electrodes is laid down on a substantially optically transparent or transmissive substrate formed of, for example, glass or plastic, where the thickness of the ITO on such substrate is about 1 micron. Next, an electrically insulative layer comprising a substantially optically transparent or transmissive material such as a suitable polymer is laid over the first set of electrodes and has a thickness of about 2 microns. Then a second layer of ITO comprising a second set of electrodes is laid down atop the electrically insulative layer and is also about 1 micron thick, thereby forming a "single-layer" sensor array, where the sensor array is disposed on a single side of the substrate. The substrate is typically about 0.5 mm in thickness. In another embodiment, first and second layers of ITO are laid down on a single side of a substrate in the same plane, and crossovers are employed to bridge between portions of the electrodes as required. See, for example, U.S. patent application Ser. No. 12/024,057 filed Jan. 31, 2008 to Harley et al. entitled "Single Layer Mutual Capacitance Sensing Systems, Devices, Components and Methods", the entirety of which is incorporated by reference herein, where examples of such cross-overs and single-layer electrode configurations are disclosed, at least some of which may be employed in conjunction with the various embodiments described or shown herein. In still another embodiment, first and second layers of ITO are laid down on opposing sides of an electrically insulative substrate.

According to one embodiment, the first and second sets of electrically conductive traces or electrodes 10 and 20 are disposed in substantially parallel but vertically-offset first and second planes, respectively, and gaps 40 have a width ranging between about 160 and about 240 microns. In one embodiment, the vertical offset between the first and second planes is about 50 microns, and an optically transmissive but electrically non-conductive material such as a suitable plastic or polymer is disposed between the first and second planes. The widths of the individual electrically conductive lines forming meshes 50 and 60 shown in FIGS. 6(a) and 6(b) generally range between about 20 microns and about 70 microns.

Continuing to refer to the embodiments illustrated in FIGS. 6(a) through 6(c), sinuous, curving boundaries 35 defining gaps 40 may be formed using spline curves, a series of connected arcs and lines, or any other geometry that results in suitably sinuous, curving boundaries 35 to define gaps 40. It has been discovered that utilizing interdigitated drive and sense electrode patterns arranged along vertical and horizontal axes disposed at right angles to one another can result in the appearance of Moiré patterns or other undesirable optical interference effects resulting from optical effects generated by the interference of the underlying rows and columns of LCD pixels and overlying rows and columns of drive and sense electrodes 10 and 20. By employing sinuous curving boundaries 35 in gaps 40 disposed between drive and sense electrodes 10 and 20, such Moiré pattern effects are minimized. In addition, curving boundaries 35 in gaps 40 provides gaps 40 having increased length for a given cell size in respect of the linear or straight gaps of the prior art, such as those shown in FIGS. 5(a) through 5(c). The increased length of gaps 40 resulting from sinuous curving boundaries 35 provides increased sensitivity to sensor array 30 due to the increased area within each cell containing electric field lines projecting between sense and drive electrodes.

It has also been found, however, that gaps 40 can be made too long, at which point sensitivity and performance will begin to degrade as electric field line density decreases below a certain threshold. In addition, gap width 42 has also been also been found to affect sensitivity and touchscreen performance. The larger gap width 42 becomes, the less electric field lines project upwardly between electrodes 10 and 20 across gap 40 and the less dense the corresponding electric field lines become. To a point, the smaller gap width 42 becomes, the more electric field lines project upwardly between electrodes 10 and 20 across gap 40 and the more dense the corresponding electric field lines become. (When gap width 42 becomes vanishingly small, the electric field lines above and below array 30 vanish as they are brought into the same plane as array 30.) Because a cover glass or layer having a thickness is typically disposed over electrode array 30, the electric field lines projecting above array 30 and between electrodes 10 and 20 must project sufficiently far upward to penetrate the thickness of the cover layer, and the electric field lines must be sufficiently dense, if the touchscreen is to be responsive to the presence of a users finger. Thus, the cover layer cannot be too thick, and the gap cannot be too small or too large, if the touchscreen is to be sufficiently responsive to a finger touch. A cover layer can be made from glass, plastic or any other suitable optically transmissive and electrically insulative material, and typically ranges between about 0.5 mm and about 1 mm in thickness. The thinner the cover layer is made, the greater the sensitivity of touchscreen 90. The thicker the cover layer is made, the greater the mechanical robustness imparted to touchscreen 90. Gap widths 42 ranging between about 160 microns and about 250 microns have been discovered to work well in some touchscreen configurations.

As further shown in FIGS. 6(a) and 6(b), according to one embodiment the first and second sets of electrically conductive traces comprise background grids of traces 50 and 60 that are arranged in a non-parallel configuration respecting rows 1, 2 and 3 and columns A, B, C and D of the first and second sets of traces corresponding to drive electrodes 10 and sense electrodes 20. In the embodiments shown in FIGS. 6(a) and 6(b), background grids or meshes of traces 50 and 60 are arranged at about 45 degrees with respect to rows 1, 2 and 3 and columns A, B, C and D of the first and second sets of traces corresponding to drive electrodes 10 and sense electrodes 20. Background grids or meshes of traces 50 and 60 feature increased optical transmissivity respecting the solid patterns of drive and sense electrodes 10 and 20 shown, for example, in FIGS. 5(a) through 5(c).

FIG. 6(c) shows another embodiment of interdigitated drive and sense electrodes 10 and 20 where sinuous, curving boundaries 35 define gaps 40 between interdigitated drive and sense electrodes 10 and 20, and further where drive and sense electrodes comprise a substantially solid pattern of ITO or other suitable electrically conductive material. FIG. 6(c) also shows that background grids or meshes of traces 50 and 60 are selectively employed in the center of cell 15a in crossover regions 12 and 22. Such grids or meshes 50 and 60 permit touch sensitivity to be retained in cross-over regions 12 and 22. In one embodiment, background grids of traces are arranged on about 250 micron centers, and the individual traces have widths ranging between about 25 microns and about 100 microns. Background grids or meshes 50 and 60 are most preferably formed of ITO, although other suitable electrically conductive materials may also be employed. In one embodiment, the widths of gaps 40 shown in FIGS. 6(a) through 6(c) range between about 170 microns and about 270 microns, and the first and second sets of electrically conductive traces 10 and 20 are disposed on an optically transmissive or optically substantially transparent substrate comprising glass, plastic or other suitable electrically insulative material.

Continuing to refer to FIGS. 6(a) through 6(c), interdigitated electrode embodiments other than those shown in such Figures are contemplated. For example, instead of each of electrodes 10 and 20 in a given cell 15a having three interdigitated fingers as shown in FIGS. 6(a) and 6(c), each of electrodes 10 and 20 in a given cell 15a may have two, four, five or any other suitable number interdigitated fingers in a given cell 15a. Odd numbers of electrode fingers in a given cell seem to work better than even numbers of electrode fingers. As the number of interdigitated fingers in a given cell increases (and gap length also increases), however, the electrical resistance of electrodes 10 and 20 also increases. Thus, there may exist a point at which the number of interdigitated electrodes in a given cell can be optimized, all other design parameters such as gap length and gap width being held constant.

Still referring to FIGS. 6(a) through 6(c), note that gaps 40 may form boundaries between sense and drive electrodes 10 and 20 that are not sinuous or curving. Instead, such gap boundaries may be intertwined boundaries, interleaved boundaries, cross-shaped boundaries, sawtooth-shaped boundaries, jigsaw-puzzle-shaped boundaries, non-linear boundaries, non-orthogonal boundaries, irregular boundaries, dendritic boundaries, tree- or branch-shaped boundaries, E-shaped boundaries, L-shaped boundaries, S-shaped boundaries, T-shaped boundaries, U-shaped boundaries, W-shaped boundaries, interconnected vertical and horizontal line boundaries, undulating boundaries, and boundaries that wind back and forth or side-to-side, or boundaries that otherwise do not form straight or linear gap boundaries such as those shown in FIGS. 5(a) through 5(c). See also foregoing-referenced U.S. patent application Ser. No. 12/024,057 to Harley et al., where other examples of gaps, gap widths and electrode patterns are disclosed, at least some of which may be employed in conjunction with the various embodiments described or shown herein.

It is further to be understood that gaps 40 between the sub-cells of each cell 15, and interleaved portions of electrodes 46 and 47 in each cell 15, may assume any of a number of different shapes, geometries, patterns or configurations. For example, widths 42 of gaps 40 may be configured to vary along the route of each gap 40. Electrodes 46 and 47 may be configured to form the interleaved fingers of FIGS. 6(a) and 6(c), or may form any other suitable shape, geometry or pattern, including, but not limited to, intertwined electrodes or interleaved cross, sawtooth, or jigsaw-shaped electrode patterns. Different numbers of interleaved electrodes other than those shown in FIGS. 6(a) and 6(c) may also be employed in each cell 15. While cells 15a shown in FIGS. 6(a) and 6(c) each contain six whole drive electrode fingers 46a through 46f interdigitated with four whole sense electrode fingers 47b, 47c, 47f and 47g and four half-width sense electrode fingers 47a, 47d, 47e, and 47h, other numbers and configurations of electrode patterns 46 and 47 are possible. For example, each cell 15a may include two whole sense electrode fingers interdigitated with four half-width sense electrode fingers, four whole sense electrode fingers interdigitated with two whole sense electrode fingers and four half-width sense electrode fingers, or six whole sense electrode fingers interdigitated with four whole sense electrode fingers and four half-width sense electrode fingers. The sense and drive electrode patterns of each cell 15 disclosed and described herein may also be reversed so that the drive electrode patterns are replaced with sense electrode patterns, and vice versa. Those skilled in the art will now understand that a virtually infinite number of different combinations, permutations and modifications of the various gap, gap width, electrode, electrode cell, and electrode sub-cell shapes, patterns and geometries disclosed herein may be made without departing from the spirit and scope of the various embodiments of the invention.

Figure 7A:
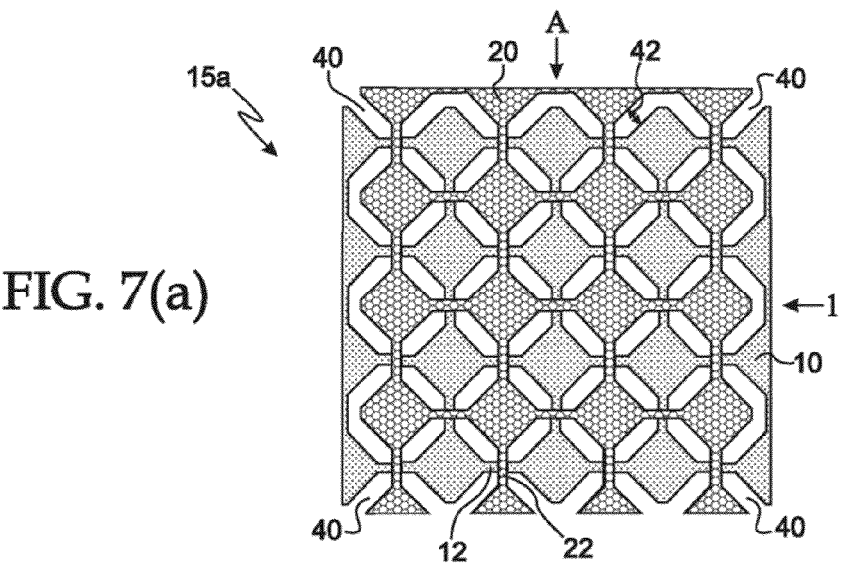
Figure 7B:
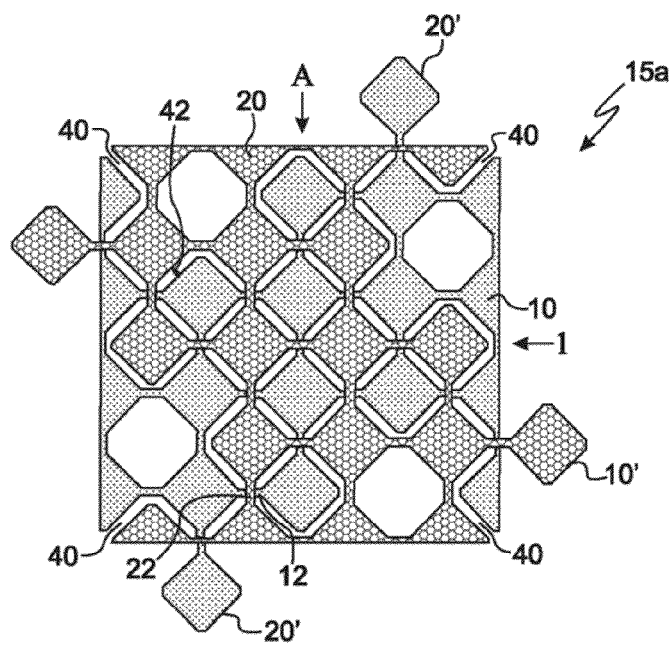

Referring now to FIGS. 7(a) and 7(b), there are shown two different embodiments of "mini-diamond" sensor cells 15a configured for use in a sensor array 30 comprising a plurality of such cells. FIG. 7(a) shows one embodiment of cell 15a where sub-cell drive electrodes 10 corresponding to a first set of electrically conductive traces are arranged in row 1 and sub-cell sense electrodes 20 corresponding to a second set of electrically conductive traces are arranged in column A. Row 1 and column A are arranged at right angles with respect to one another in cell 15a and other cells in array 30. Not shown in FIG. 7(a) or 7(b) are other cells included in sensor array 30, which comprises the complete first and second sets of electrically conductive traces.

The first and second sets of traces are electrically insulated from another and form a plurality of substantially rectangular or square cells in each of rows 1, 2, and 3 and columns A, B and C, where each cell comprises a plurality of sub-cell diamond-shaped drive electrodes 10 electrically connected to one another by first cross-over traces 12 and a plurality of sub-cell diamond-shaped sense electrodes 20 electrically connected to one another by second cross-over traces 22. As shown in FIGS. 7(a) and 7(b), sub-cell diamond-shaped drive and sense electrodes 10 and 20 are interleaved with respect to, and disposed in between, one another within each cell 15a. Sub-cell sense and drive electrodes 10 and 20 are separated by gaps 40 within cell 15a. In preferred embodiments, gaps 40 have width 42 ranging between about 100 microns and about 300 microns.

The first and second sets of electrically conductive traces comprise and are electrically connected to the sub-cell drive and sense electrodes. 10 and 20 in each cell, respectively. In a preferred embodiment, the first and second sets of electrically conductive traces are disposed in substantially parallel but vertically-offset first and second planes, respectively. As shown in FIGS. 7(a) and 7(b), the first and second sets of electrically conductive traces forming sub-cell drive electrodes 10 and sub-cell sense electrodes 20 comprise a substantially solid pattern formed of a suitable electrically conductive material such as ITO. In a preferred embodiment, the first and second sets of electrically conductive traces form an array of like cells, where each cell is a square having sides about 4.6 mm long. By way of example, in one embodiment the widths of the first and second cross-over traces 12 and 22 may range between about 40 microns and about 140 microns. Other dimensions are of course contemplated.

Referring now to FIG. 7(*b*), there is shown an embodiment of cell 15*a* where two sub-cell diamond-shaped drive electrodes 10' extend outside cell 15*a* for juxtaposition or placement inside neighboring cells. Similarly, two sub-cell diamond-shaped sense electrodes 20' extend outside cell 15*a* for juxtaposition or placement inside neighboring cells. As illustrated in FIG. 7(*b*), sub-cell diamond-shaped drive electrodes 10' and sub-cell diamond-shaped sense electrodes 20' are electrically connected to other diamond-shaped sub-cell drive electrodes 10 and sense electrodes 20 located within cell 15*a*. Electrodes 10' and 20' in FIG. 7(*b*) are configured to permit enhanced touch resolution of array 30 to be obtained through a reduction in the effective area of cell 15*a*.

The concept of reducing effective cell size by interleaving sub-electrodes 10' and 20' within neighboring cells is further illustrated by referring to FIGS. 7(*c*) through 7(*f*). FIG. 7(*c*) shows a 3×3 array 30 comprising sensor cells 15(*a*) through 15*i*, where no sub-cell electrodes 10' or 20' extend from one cell into neighboring cells. Circle 17 in FIG. 7(*c*) illustrates the diameter of a touch object sufficiently large to enable resolving motion with sufficient precision to support more advanced applications or the use of a small tipped stylus. In the case where cells 15*a* through 15*i* are each 4.6 mm square, circle 17 is about 4.9 mm in diameter, and corresponds approximately to the area of a touch object required to effect sufficient precision to support more advanced applications or the use of a small tipped stylus. FIG. 7(*d*) shows a similar 3×3 array 30 comprising sensor cells 15(*a*) through 15*i*, but where sub-cell electrodes 10' or 20' do extend from one cell into neighboring cells. Circle 17 in FIG. 7(*d*) illustrates the reduced diameter of a touch object sufficiently large to enable resolving motion with sufficient precision to support some of the more advanced applications or the use of a small tipped stylus. As shown in FIG. 7(*d*), circle 17 represents the effectively reduction in the apparent size of each of cells 15*a* through 15*i*. By interlacing cells 15*a* through 15*i* in the manner illustrated in FIGS. 7(*d*) and 7(*e*), the maximum size of a contact object located at the center of a cell (represented by circle 17) can be smaller and yet still interact with adjacent cells when the contact object moves away from the center of each the cell. Thus, while the actual cell size of each of cells 15*a* through 15*i* might be, by way of example, 4.6 mm square, the effective diameter of circle 17 in FIG. 7(*d*) is only 3.5 mm. Such reduced effective cell size enables the detection of a fairly small stylus by array 30. Movement of a touch object from the middle of a cell, where the touch object has a diameter of 3.5 mm, will cause immediate detection of the touch object by neighboring cells, even though the touch object has a diameter less than the dimensions of the cell over which it is located.

Figure 7E:
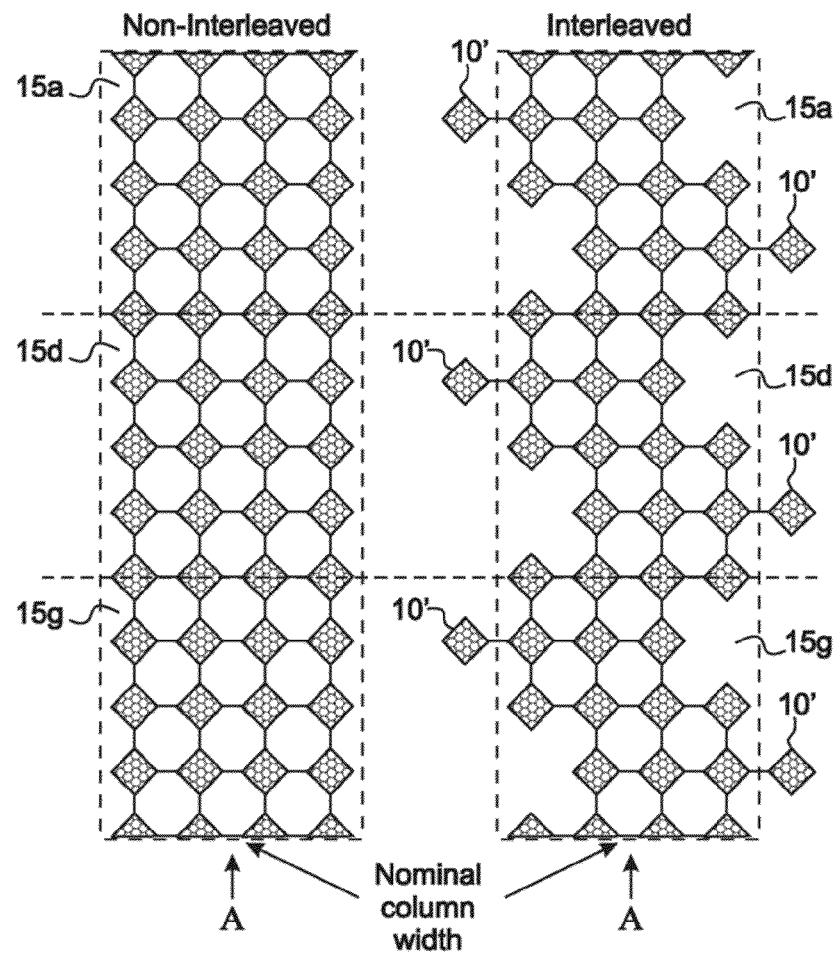
Figure 8A:
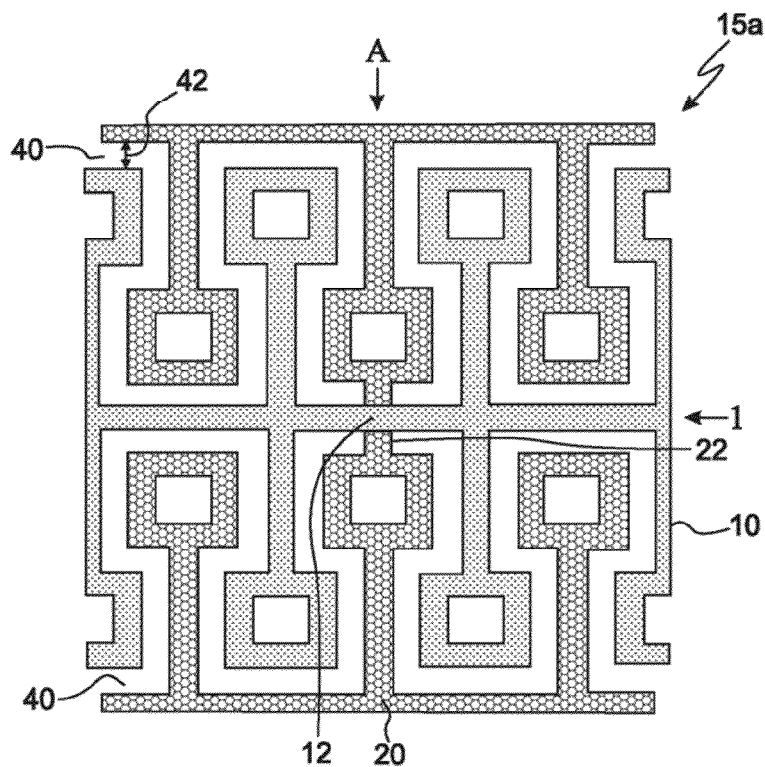
FIGS. 8(a) through 8(d) illustrate four embodiments of mutual capacitance touchscreen cells particularly well adapted for low cost production techniques.
Figure 8B:
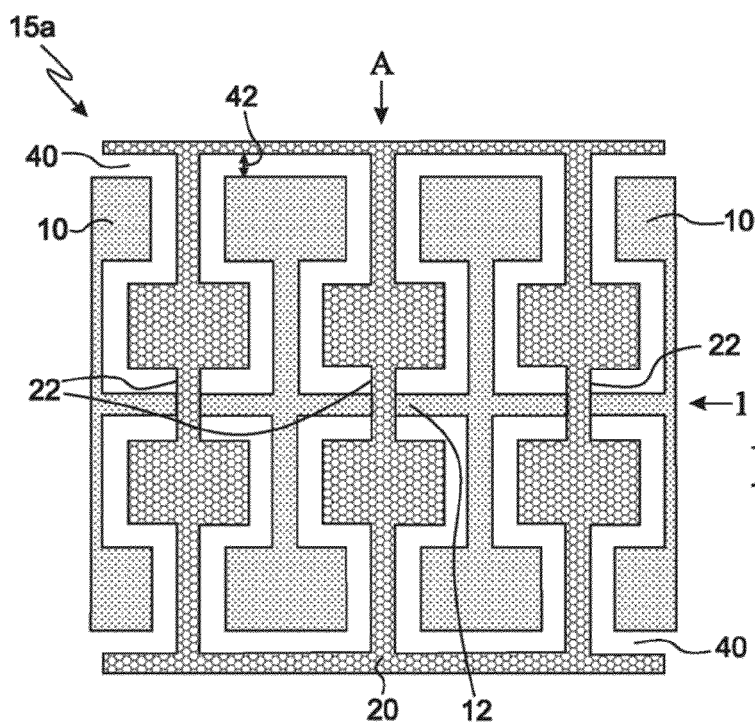
Figure 8C:
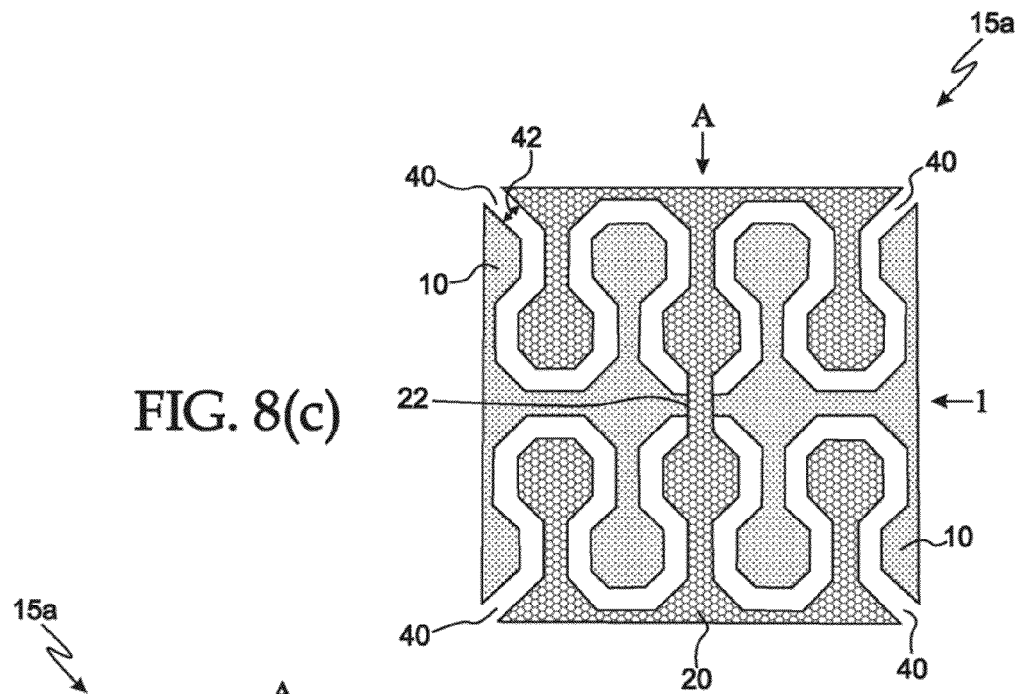
Figure 8D:
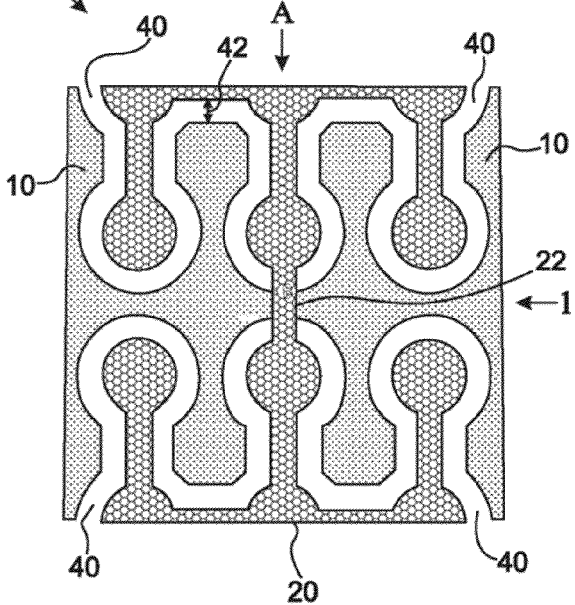

FIG. 7(*e*) illustrates the structural differences between one embodiment of a non-interleaved "mini-diamond" column A of cells 15*a*, 15*d* and 15*g* (see the left-hand side of FIG. 7*e*)), and one embodiment of an interleaved "mini-diamond" column A of cells 15*a*, 15*d* and 15*g* (see the right-hand side of FIG. 7*e*)). As shown on the right side of FIG. 7(*e*), sub-cell electrodes 10' project outwardly from cells 15*a*, 15*d* and 15*g* for inclusion in neighboring cells, while cells 15*a*, 15*d* and 15*g* also include spaces for accommodating like sub-cell electrodes 10' extending therein from neighboring cells. FIG. 7(*f*) illustrates how the responses of non-interleaved and interleaved sensor arrays of FIG. 7(*e*) differ in the presence of a moving touch object. As depicted in FIG. 7(*f*), an interleaved sensor array provides a smoother and broader response to the touch object owing to its smaller effective cell sizes.

Referring now to FIGS. 7(*d*) and 7(*e*), it will be seen that the interleaved electrode patterns shown therein find particularly efficacious application at the edges and corners of array 30. Compared to the standard prior art designs shown in FIGS. 5(*a*) through 5(*c*), the smaller sub-cell drive and sense electrodes of FIGS. 7(*d*) and 7(*e*) permit relatively accurate and robust sensing of a touch object in the corners and at the edges of array 30, notwithstanding the use of half-width sub-cell electrodes at such portions of array 30. Note further that the electrode configurations shown in FIGS. 6(*a*) through 6(*c*) and in FIGS. 7(*a*), 7(*b*), 8(*a*) and 8(*b*) also feature relatively small sub-cell drive and sense electrodes, and therefore also permit relatively accurate and robust sensing of a touch object in the corners and at the edges of array 30, notwithstanding the use of half-width sub-cell electrodes at such portions of array 30. The small sub-cell drive and sense electrodes disclosed herein permit increased sensitivity and improved linearity of response to be achieved in the corners and at the edges of array 30. For example, and referring to FIG. 6(*a*), while cells 15 employed in the corners or at the edges of array 30 may be made smaller than cells 15 disposed away from the edges or corners of array 30, it may be advantageous to configure such corner or edge cells 15 such that the size of middle portion of cell 15*a*, and more particularly cross-over region 22 lying within the inner boundaries of imaginary lines 16*a* and 16*b*, and 17*a* and 17*b*, is conserved while other outlying portions of cell 15*a* are attenuated, squished or otherwise reduced in size, thereby preserving the sensitivity of such corner or edge cells.

The various embodiments of sensor arrays 30 illustrated in FIGS. 6(*a*) through 7(*f*) and described above are preferably fabricated using fairly advanced and highly accurate photolithographic fabrication techniques, where ITO is laid down on suitable substrate(s) with relatively great precision, and where the drive and sense electrode patterns are registered accurately in respect of one another. The use of such advanced and accurate ITO patterning techniques increases the cost of manufacturing touchscreens 90. To reduce such manufacturing costs, it is desirable to employ pattern printing techniques that are less expensive. FIGS. 8(*a*) through 8(*d*) show four different embodiments of cells 15*a* suitable for production using low-cost printing techniques such as transfer printing, where a mandrel with an electrode pattern embossed thereon is covered with an electrically conductive ink that is rolled onto a suitable substrate such as glass or plastic to form an electrode pattern thereon.

As further shown in FIGS. 8(*a*) through 8(*d*), a first set of electrically conductive traces is arranged in row 1 and a second set of electrically conductive traces is arranged in column A at right angles with respect to the row 1 of the first set for each of cells 15*a*. The first and second sets of traces are electrically insulated from one another and form a plurality of substantially rectangular or square sub-cell electrodes in row 1 and column A. The electrode sub-cell patterns shown in FIGS. 8(*a*) through 8(*d*) are repeated to form a complete array 30 containing a plurality of like cells. In some embodiments such as those shown in FIGS. 8(*a*) and 8(*b*), each cell comprises a plurality of sub-cell rectangular or square drive electrodes electrically connected to one another by first cross-over traces 12 and a plurality of sub-cell rectangular or square sense electrodes electrically connected to one another by second cross-over traces 22. The sub-cell drive and sense electrodes are interleaved with respect to, and disposed in between, one another within each cell 15a. In other embodiments such as those shown in FIGS. 8(c) and 8(d), each cell comprises a plurality of non-rectangular or non-rectilinear drive electrodes, where electrodes 20 are electrically connected to one another by cross-over traces 22. The sub-cell drive and sense electrodes are interleaved with respect to, and disposed in between, one another within each cell 15a.

In FIGS. 8(a) through 8(d), sub-cell drive and sense electrodes 10 and 20 are separated by gaps 40 within each cell. The first and second sets of electrically conductive traces comprise, and are electrically connected to, the drive and sense electrodes 10 and 20. In the embodiments of cells 15a illustrated in FIGS. 8(a) through 8(d), the drive electrodes are disposed on one electrically insulative substrate, such as a plastic or glass sheet, while the sense electrodes are patterned on another electrically insulative substrate. The two substrates are then bonded or laminated together, such as by heating or gluing, to form touchscreen 90.

In the embodiments illustrated in FIGS. 8(a) through 8(d), it is preferred that the trace widths approximate 250 microns, which is the approximate lower limit of transfer printing resolution using ITO. In one embodiment, each of the rectangles or squares forming the sub-cell drive and sense electrodes in cells 15a is about 1 mm by about 1 mm, and cells 15a are about 6 mm by about 6 mm. The electrode patterns of FIGS. 8(a) through 8(d) have wider features and can tolerate greater misalignment between layers than those illustrated in FIGS. 6(a) through 7(e). While the electrode patterns shown in FIGS. 8(a) through 8(d) may not reduce Moiré pattern or other undesirable optical interference effects, they may be manufactured at relatively low cost and are suitable in some of the less technically demanding touchscreen applications.

Referring now to FIGS. 6(a) through 8(d), it is to be noted that sensor arrays 30 may be provided in any of a number of different configurations, sizes and shapes according to the particular application at hand. For example, rows and columns of electrodes, or the mesh patterns shown in FIGS. 6(a) through 6(c), need not be arranged at right angles with respect to one another, and instead may be configured at any suitable angle with respect to one another. Examples of such angles include, but are not limited to, an angle ranging between about 20 degrees and about 160 degrees, between about 40 degrees and about 140 degrees, between about 60 degrees and about 120 degrees, between about 80 degrees and about 100, between about 85 degrees and about 95 degrees, and about 90 degrees.

Continuing to refer to FIGS. 6(a) through 8(d), arrays 30 need not form squares or rectangles, but may form parallelograms, rhombuses, or any other suitable shape, geometry or pattern. Cells 15, including individual cell 15a shown in the Figures, and the individual sub-cells contained in each of such cells 15, also need not be configured in squares or rectangles, and instead may assume any suitable shape or geometry according the particular application at hand, such as triangles, rhombuses, various interdigitated, intermeshed, interleaved or intertwined geometries or patterns such as fingers or sawtooth electrode patterns, or indeed any of a number of virtually infinite possibilities that will now become apparent to those skilled in the art, including irregular patterns. The sizes of cells 15 and the sub-cells contained therein may also generally vary according to the size of the touchscreen and the number of elements included in sensor array 30. Two standard array sizes are 9×16 sensor arrays and 8×12 sensor arrays, which find particularly efficacious application in touchscreen sizes ranging between 2.5" and 4.3" (where screen size is measured diagonally). Other array sizes are certainly contemplated, however. Depending on screen size and the particular sensor array that is selected, cells 15 may be square, rectangular or any other suitable shape or geometry. By way of example, each cell may form a rectangle or square having sides ranging between about 3 mm and about 7 mm in length.

The various embodiments of touchscreens 90, arrays 30, and cells 15 illustrated in FIGS. 1 through 8(d) operate in accordance with the principles of mutual capacitance. Capacitances are established between individual sense and drive electrodes by means of a drive waveform input to drive electrodes 10. A user's finger is typically at or near electrical ground, and engages a touch surface 97 that overlies array 30. Layer 95 may be disposed between array 30 and the user's finger. When in contact with touch surface 97, the user's finger couples to the drive signal provided by a drive electrode 10 in closest proximity thereto and proportionately reduces the amount of capacitance between such drive electrode 10 and its corresponding nearby sense electrode 20. That is, as the user's finger moves across touch surface 97, the ratio of the drive signal coupled to the respective individual sense electrodes 20 through the finger is reduced and varied, thereby providing a two-dimensional measurement of a position of the user's finger above electrode array 30.

In such a manner, the capacitance at a single row-column intersection corresponding to the user's finger location is determined. By scanning all the rows and columns of array 30, a map of capacitance measurements may be created for all the nodes in the grid. Because each measurement probes only a single grid intersection point, no measurement ambiguities arise with multiple touches as in the case of some self-capacitance systems. A capacitive touchscreen system may also be configured to sense multiple touch locations in electrode array 30 substantially simultaneously, and to that end a host computer may be updated at a rate that is quick enough to permit fast but not altogether "simultaneous" measurements such that all the rows and columns of array 30 are scanned sequentially to determine the position of any finger touches. More than one finger position can be detected if a quick enough update rate is employed, even though technically such positions are not actually measured simultaneously.

Those skilled in the art will understand that touchscreen 90 may be employed or incorporated into a number of different devices, including, but not limited to, an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device or a household appliance.

Note further that the various teachings presented herein may be applied to optically transmissive or non-optically-transmissive touchpads disposed, for example, on a printed circuit board, a flex board or other suitable substrate. While the primary use of capacitive touchscreen 90 is believed likely to be in the context of relatively small portable devices, and touchpads or touchscreens therefore, it may also be of value in the context of larger devices, including, for example, keyboards associated with desktop computers or other less portable devices such as exercise equipment, industrial control panels, household appliances, and the like. Similarly, while many embodiments of the invention are believed most likely to be configured for manipulation by a user's fingers, some embodiments may also be configured for manipulation by other mechanisms or body parts. For example, the invention might be located on or in the hand rest of a keyboard and engaged by the heel of the user's hand. Furthermore, the invention is not limited in scope to drive electrodes disposed in rows and sense electrodes disposed in columns. Instead, rows and columns are interchangeable in respect of sense and drive electrodes.

Note further that included within the scope of the present invention are methods of making and having made the various components, devices and systems described herein.

The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A mutual capacitance touchscreen, comprising:
   a first set of electrically conductive traces arranged in rows or columns, and
   a second set of electrically conductive traces arranged in rows or columns arranged at an angle with respect to the rows or columns of the first set; wherein the first and second sets of traces are electrically insulated from another, each cell comprising a plurality of sub-cell rectangular or square drive electrodes electrically connected to one another by first cross-over traces and a plurality of sub-cell rectangular or square sense electrodes electrically connected to one another by second cross-over traces, the sub-cell drive and sense electrodes being interleaved with respect to, and disposed in between, one another within each cell, the sub-cell sense and drive electrodes being separated by gaps within each cell, the first and second sets of electrically conductive traces comprising and being electrically connected to the drive and sense electrodes;
   wherein the sub-cell rectangular or square drive or sense electrodes each form a pattern having an unfilled empty center surrounded by an electrically conductive material.

2. The mutual capacitance touchscreen of claim 1, wherein the first and second sets of traces form a plurality of substantially rectilinear, rectangular or square cells in each of the rows and columns.

3. The mutual capacitance touchscreen of claim 1, wherein each cell comprises a plurality of diamond-shaped sub-cells.

4. The mutual capacitance touchscreen of claim 1, wherein the first and second sets of traces form a sensor array comprising a plurality of cells, the array having corners and edges, cells located at the corners and edges of the array having reduced width or length with respect to cells not located at the corners and edges.

5. The mutual capacitance touchscreen of claim 1, wherein the angle is about 90 degrees.

6. The mutual capacitance touchscreen of claim 1, wherein the first and second sets of electrically conductive traces are disposed in substantially parallel but vertically-offset first and second planes, respectively.

7. The mutual capacitance touchscreen of claim 1, wherein each of the gaps has a width ranging between about 100 microns and about 300 microns.

8. The mutual capacitance touchscreen of claim 1, wherein the first or second set of electrically conductive traces further comprises a substantially solid pattern.

9. The mutual capacitance touchscreen of claim 1, wherein the first or second set of electrically conductive traces comprises indium tin oxide ("ITO").

10. The mutual capacitance touchscreen of claim 1, wherein the first and second sets of electrically conductive traces form a 9×16 sensor array or an 8×12 sensor array.

11. The mutual capacitance touchscreen of claim 1, wherein the first and second sets of electrically conductive traces form an array of cells, where each cell forms a rectangle or square having sides ranging between about 3 mm and about 7 mm in length.

12. The mutual capacitance touchscreen of claim 1, wherein the first and second cross-over traces have widths ranging between about 40 microns and about 140 microns.

13. The mutual capacitance touchscreen of claim 1, wherein each cell further comprises at least one sub-cell diamond-shaped drive electrode extending outside such cell to a neighboring cell, and at least one sub-cell diamond-shaped sense electrode extending outside such cell to another neighboring cell, the at least one sub-cell diamond-shaped drive electrode and the at least one sub-cell diamond-shaped sense electrode being electrically connected to other diamond-shaped sub-cell drive and sense electrodes located within such cell.

14. The mutual capacitance touchscreen of claim 1, wherein a liquid crystal display is disposed therebeneath.

15. The mutual capacitance touchscreen of claim 1, wherein the first and second sets of electrically conductive traces are disposed on a substrate comprising an electrically insulative material.

16. The mutual capacitance touchscreen of claim 15, wherein the substrate is substantially optically transparent.

17. The mutual capacitance touchscreen of claim 1, further comprising a drive signal circuit operably connected to the first or second sets of electrically conductive traces and configured to provide an electrical drive signal thereto.

18. The mutual capacitance touchscreen of claim 1, further comprising a capacitance sensing circuit operably coupled to the first or second sets of electrically conductive traces and configured to detect changes in capacitance occurring in the vicinity thereof.

19. The mutual capacitance touchscreen of claim 17 or 18, wherein at least one of the drive signal circuit and the capacitance sensing circuit is incorporated into an integrated circuit.

20. The mutual capacitance touchscreen of claim 1, wherein the touchscreen is incorporated into or forms a portion of an LCD, a computer display, a laptop computer, a personal data assistant (PDA), a mobile telephone, a radio, an MP3 player, a portable music player, a stationary device, a television, a stereo, an exercise machine, an industrial control, a control panel, an outdoor control device and a household appliance.

* * * * *